(12) United States Patent
Kanada et al.

(10) Patent No.: US 10,328,495 B2
(45) Date of Patent: Jun. 25, 2019

(54) CUTTING TOOL (71) Applicant: SUMITOMO ELECTRIC HARDMETAL CORP., Itami-shi (JP)

(72) Inventors: Yasuyuki Kanada, Itami (JP); Kunishige Tanaka, Itami (JP); Shota Takemura, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 0 days.

(21) Appl. No.: 15/568,937

(22) PCT Filed: Jan. 31, 2017

(86) PCT No.: PCT/JP2017/003359
§ 371 (c)(1),
(2) Date: Oct. 24, 2017

(87) PCT Pub. No.: WO2017/187693
PCT Pub. Date: Nov. 2, 2017

(65) Prior Publication Data
US 2018/0221964 A1 Aug. 9, 2018

(30) Foreign Application Priority Data

Apr. 27, 2016 (JP) .................................. 2016-088957

(51) Int. Cl.
*B23B 27/16* (2006.01)
*B23B 27/14* (2006.01)
*B23B 1/00* (2006.01)

(52) U.S. Cl.
CPC ............ *B23B 27/1611* (2013.01); *B23B 1/00* (2013.01); *B23B 27/145* (2013.01);
(Continued)

(58) Field of Classification Search
CPC ..... B23B 27/1611; B23B 27/20; B23B 27/14; B23B 27/00; B23B 2200/0485;
(Continued)

(56) References Cited

U.S. PATENT DOCUMENTS 3,792,515 A * 2/1974 Lundgren ............. B23B 27/143
407/113
7,670,980 B2 * 3/2010 Dahl ................. C04B 35/58021
501/96.3

(Continued)

FOREIGN PATENT DOCUMENTS

CN 1638901 A 7/2005
CN 201889453 U 7/2011
(Continued)

OTHER PUBLICATIONS

English Translation of FR 2223122, Oct. 1974.*

*Primary Examiner* — Alan Snyder
(74) *Attorney, Agent, or Firm* — Baker Botts LLP; Michael A. Sartori (57) ABSTRACT

A cutting tool according to an aspect of the present invention is a cutting tool for cutting a rotationally symmetrical surface of a rotating workpiece. The cutting includes the step of feeding the cutting tool in a direction inclined with respect to a rotational axis of the rotationally symmetrical surface, while holding the cutting tool in contact with the rotationally symmetrical surface. In the step of feeding the cutting tool, the cutting tool has a point that is in contact with the rotationally symmetrical surface and the point shifts as the cutting tool is fed. The cutting tool includes: a rake face; a flank face; and a cutting edge connecting the rake face and the flank face. The cutting edge as seen from above the flank face has a shape including at least one arc, and the arc has a radius of curvature of not less than 100 mm and not more than 500 mm.

6 Claims, 6 Drawing Sheets

(52) U.S. Cl.
CPC ... *B23B 2200/0485* (2013.01); *B23B 2200/08* (2013.01); *B23B 2200/20* (2013.01); *B23B 2200/202* (2013.01); *B23B 2200/242* (2013.01); *B23B 2200/245* (2013.01); *B23B 2200/28* (2013.01); *B23B 2200/3609* (2013.01); *B23B 2200/369* (2013.01); *B23B 2200/3663* (2013.01); *B23B 2224/04* (2013.01); *B23B 2226/125* (2013.01)

(58) Field of Classification Search
CPC ........ B23B 2200/202; B23B 2200/242; B23B 2200/245
See application file for complete search history.

(56) References Cited

U.S. PATENT DOCUMENTS

| | | | |
|---|---|---|---|
| 2003/0089204 A1 | | 5/2003 | Schreiber et al. |
| 2003/0170080 A1 * | | 9/2003 | Hecht ..................... B23B 27/08 407/113 |

FOREIGN PATENT DOCUMENTS

| | | | | |
|---|---|---|---|---|
| FR | 2223122 A1 | * | 10/1974 | ........... B23B 27/141 |
| JP | 61219511 A | * | 9/1986 | ........... B23B 27/145 |
| WO | 01/43902 A2 | | 6/2001 | |
| WO | 03/074218 A1 | | 9/2003 | |

* cited by examiner

CUTTING TOOL

TECHNICAL FIELD

The present invention relates to cutting tools. The present application claims priority to Japanese Patent Application No. 2016-088957 filed Apr. 27, 2016. The disclosure in the above-identified Japanese patent application is incorporated herein by reference in its entirety.

BACKGROUND ART

WO2001/043902 (Patent Document 1) discloses a method of machining a workpiece. According to the method, a cutting edge is positioned askew with respect to a feed direction and fed in a transverse direction to a rotational axis of a rotating workpiece. The machining method enables the surface of the workpiece to be machined into a smooth surface and also enables high-productivity machining.

CITATION LIST

Patent Document

PTD 1: WO2001/043902

SUMMARY OF INVENTION

A cutting tool according to an aspect of the present invention is a cutting tool for cutting a rotationally symmetrical surface of a rotating workpiece. The cutting includes the step of feeding the cutting tool in a direction inclined with respect to a rotational axis of the rotationally symmetrical surface, while holding the cutting tool in contact with the rotationally symmetrical surface. In the step of feeding the cutting tool, the cutting tool has a point that is in contact with the rotationally symmetrical surface and the point shifts as the cutting tool is fed. The cutting tool includes: a rake face; a flank face; and a cutting edge connecting the rake face and the flank face. The cutting edge as seen from above the flank face has a shape including at least one arc, and the arc has a radius of curvature of not less than 100 mm and not more than 500 mm.

DESCRIPTION OF EMBODIMENTS

Problem to be Solved by the Disclosure

WO2001/043902 does not specifically disclose cutting tools suitable for cutting as described above.

An object of the present disclosure is to provide a cutting tool suitable for cutting a rotationally symmetrical surface of a rotating workpiece.

Description of Embodiments of the Invention

Initially, manners of carrying out the present invention are described one by one.

(1) A cutting tool according to an aspect of the present invention is a cutting tool for cutting a rotationally symmetrical surface of a rotating workpiece. The cutting includes the step of feeding the cutting tool in a direction inclined with respect to a rotational axis of the rotationally symmetrical surface, while holding the cutting tool in contact with the rotationally symmetrical surface. In the step of feeding the cutting tool, the cutting tool has a point that is in contact with the rotationally symmetrical surface and the point shifts as the cutting tool is fed. The cutting tool includes: a rake face; a flank face; and a cutting edge connecting the rake face and the flank face. The cutting edge as seen from above the flank face has a shape including at least one arc, and the arc has a radius of curvature of not less than 100 mm and not more than 500 mm.

Thus, a cutting tool suitable for cutting a rotationally symmetrical surface of a rotating workpiece can be provided. In the step of feeding the cutting tool, the point of the cutting tool that is in contact with the rotationally symmetrical surface shifts as the cutting tool is fed. Namely, the whole of the cutting edge is used for cutting the rotationally symmetrical surface. Accordingly, the surface roughness of the rotationally symmetrical surface can be reduced. The shape of the cutting edge as seen from above the flank face includes an arc, and thus the cutting resistance can be reduced. Meanwhile, the radius of curvature of the arc is not less than 100 mm and not more than 500 mm, and thus the wear amount of the flank face can be reduced. In this way, the cutting tool life can be extended.

(2) Preferably, as to the cutting tool described under (1), the cutting edge has a length of not less than 12 mm and not more than 50 mm.

Thus, with the whole of the cutting edge, a rotationally symmetrical surface can be cut. Accordingly, the wear amount of the flank face can be reduced. In this way, the cutting tool life can be extended. If the cutting edge is short, the point of the cutting tool that is in contact with the rotationally symmetrical surface hardly shifts during cutting. In the case of such cutting (point cutting), the wear amount of the flank face is likely to increase. On the contrary, if the cutting edge is long, the point of the cutting tool that is in contact with the rotationally symmetrical surface can be shifted along the cutting edge during cutting. The cutting tool, however, is likely to have a portion which is not used for cutting. The above-described features thus enable the cutting edge to be used efficiently.

(3) Preferably, as to the cutting tool described under (1) or (2), the rake face and the flank face form a wedge angle of the cutting tool of not less than 65° and not more than 90°.

Thus, the cutting resistance can be reduced. In the case of cutting of a workpiece made of a high-hardness material, a greater force is applied to the cutting edge so as to cause the cutting edge to bite into the workpiece. The wedge angle falling in the above-defined range enables further reduction of the possibility that the cutting edge is damaged (fracture occurs to a part of the cutting edge, for example).

(4) Preferably, as to the cutting tool described under any one of (1) to (3), the cutting edge is a part of a sintered material containing cubic boron nitride.

Thus, the cutting edge is formed of a material having a sufficient hardness for stable machining. Accordingly, a workpiece made of a high-hardness material can be cut and the cutting tool life can be extended.

(5) Preferably, as to the cutting tool described under any one of (1) to (4), the cutting edge as seen from above the flank face has a shape tapering toward a back surface opposite to the rake face.

Thus, flank angles are also formed laterally with respect to the cutting edge. Accordingly, the whole of the cutting edge from one end of the cutting edge to the other end thereof can be used for cutting a rotationally symmetrical surface.

(6) Preferably, as to the cutting tool described under any one of (1) to (5), the cutting edge includes a first end and a second end opposite to the first end. The first end and the second end each have a radius of curvature smaller than the radius of curvature of the cutting edge.

Thus, the possibility that fracture occurs to the first end or the second end of the cutting tool during cutting of a rotationally symmetrical surface can be reduced.

(7) Preferably, as to the cutting tool described under any one of (1) to (6), the cutting edge has a rounded honed portion. A honing amount of the honed portion with respect to the rake face is not less than 0.001 mm and not more than 0.030 mm.

Thus, the strength of the cutting edge can be maintained while the cutting resistance is prevented from increasing.

(8) Preferably, as to the cutting tool described under any one of (1) to (7), the cutting edge has a negative land portion. The negative land portion forms an angle of not less 0° and not more than 35° with the flank face.

Thus, the cutting resistance can be prevented from increasing.

Details of Embodiments of the Invention

Embodiments of the present invention will be described hereinafter based on the drawings. In the following drawings, the same or corresponding parts are denoted by the same reference numerals, and a description thereof will not be repeated. For the sake of easy understanding of description, only a part of components of the invention may be shown in the drawings.

Figure 1:
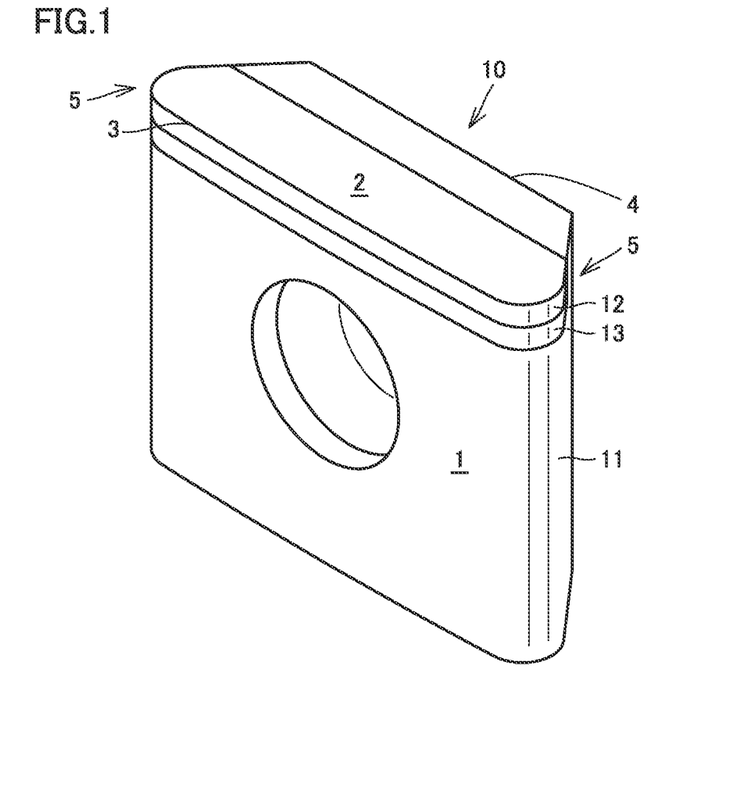
FIG. 1 is a perspective view of a cutting tool according to an embodiment of the present invention.
Figure 2:
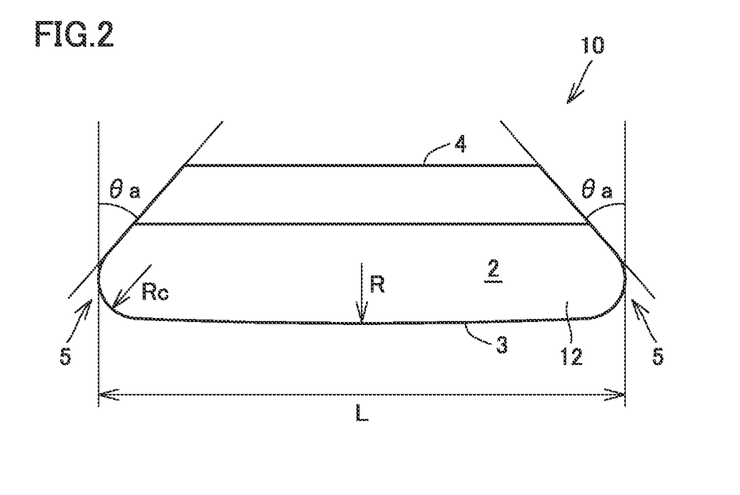
FIG. 2 is a top view of the cutting tool according to an embodiment of the present invention.
Figure 3:
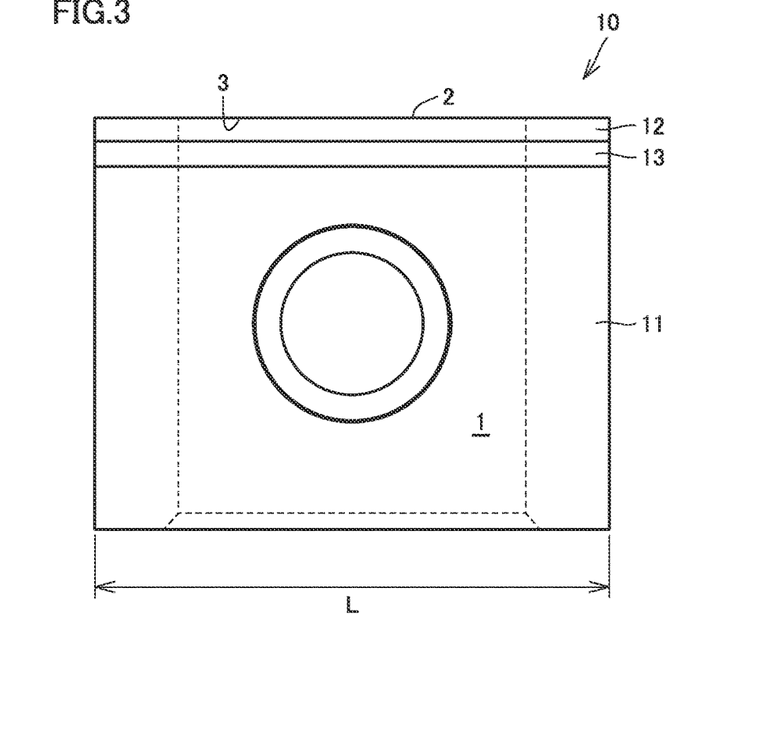
FIG. 3 is a front view of the cutting tool according to an embodiment of the present invention.
Figure 4:
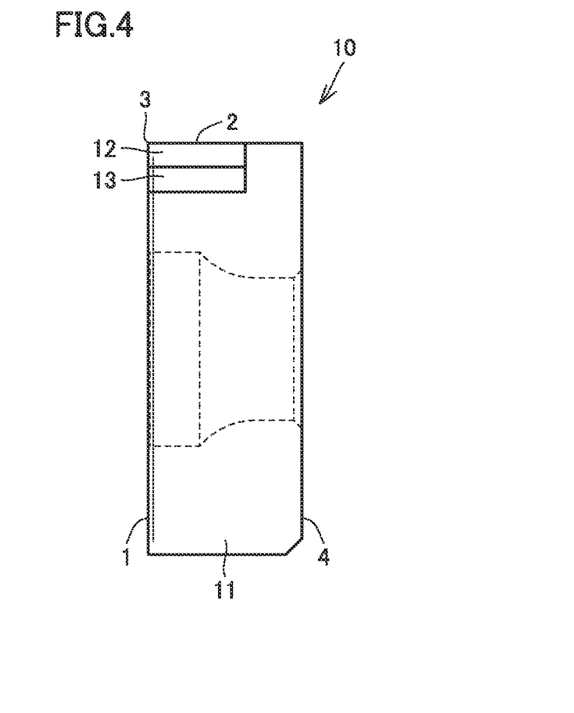
FIG. 4 is a right side view of the cutting tool according to an embodiment of the present invention.

FIG. 1 is a perspective view of a cutting tool according to an embodiment of the present invention. FIG. 2 is a top view of the cutting tool according to an embodiment of the present invention. FIG. 3 is a front view of the cutting tool according to an embodiment of the present invention. FIG. 4 is a right side view of the cutting tool according to an embodiment of the present invention.

Referring to FIGS. 1 to 4, a cutting tool 10 according to an embodiment of the present invention includes a rake face 1, a flank face 2, and a cutting edge 3.

Cutting edge 3 corresponds to an intersection of rake face 1 and flank face 2. In other words, cutting edge 3 corresponds to a portion formed by connecting rake face 1 and flank face 2 together.

Cutting edge 3 may be a ridgeline connecting rake face 1 and flank face 2 together. Such a cutting edge may be called "sharp edge." Alternatively, one or more parts selected from the group consisting of a honed portion, or a negative land portion, or a combination of a honed portion and a negative land portion produced by machining cutting edge 3 may be formed in the surface (cutting edge 3) connecting rake face 1 and flank face 2 together. Specific examples of the honed portion and the negative land portion are described later herein.

Cutting tool 10 includes a base material 11, a hard sintered material 12, and a joint member 13. Base material 11 includes at least a part of rake face 1 and at least a part of flank face 2. Further, base material 11 includes a back surface 4 located opposite to rake face 1.

Hard sintered material 12 is a sintered material containing cubic boron nitride (hereinafter also referred to as "cBN"). The cutting edge is formed of the material having a hardness sufficient for stable machining. Accordingly, a workpiece made of a high-hardness material can be cut, and the life of the cutting tool can be extended. Hard sintered material 12 may be a sintered material containing cBN, $Al_2O_3$, and a Zr compound, for example. Hard sintered material 12 forms cutting edge 3, at least a part of rake face 1, and at least a part of flank face 2. Joint member 13 is a member joining hard sintered material 12 to base material 11.

As shown typically in FIG. 2, the shape of cutting edge 3 as seen from above flank face 2 is an arc. The arc has a radius of curvature R of not less than 100 mm and not more than 500 mm. In an embodiment, radius of curvature R is 150 mm.

In an embodiment shown in FIGS. 2 to 4, the shape of cutting edge 3 as seen from above flank face 2 is a single arc. Cutting edge 3, however, may have a shape made up of a combination of multiple arcs.

Cutting edge 3 has a length L. In an embodiment, length L is not less than 12 mm and not more than 50 mm. In an embodiment, length L falls in a range of 15 mm to 20 mm.

Cutting edge 3 has a corner 5 at each of a first end and a second end opposite to the first end. Corner 5 is rounded. Corner 5 has a radius of curvature Rc smaller than radius of curvature R of cutting edge 3 (Rc<R). Accordingly, cutting edge 3 has a lateral flank angle θa. In other words, the shape of the cutting edge as seen from above flank face 2 is tapered from rake face 1 toward back surface 4. In an embodiment, flank angle θa is 41°.

Figure 5:
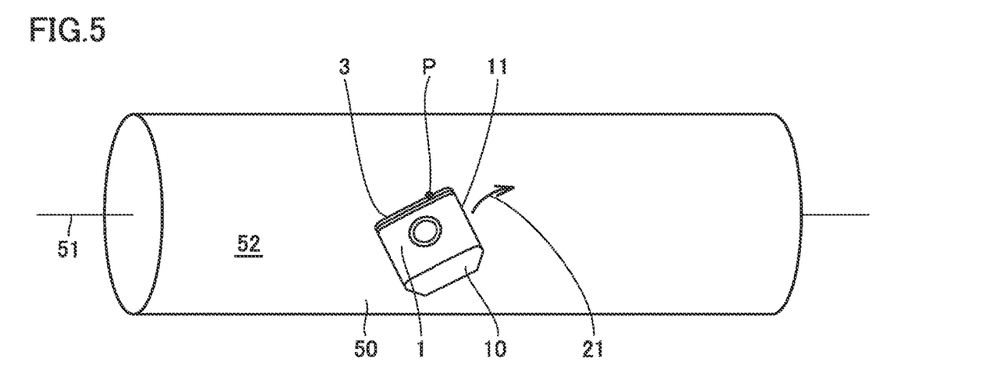
FIG. 5 is a schematic diagram showing cutting (hard skiving) with the cutting tool according to an embodiment of the present invention.

FIG. 5 is a schematic diagram showing cutting with the cutting tool according to an embodiment of the present invention. Referring to FIG. 5, a workpiece 50 rotates about a rotational axis 51. Cutting tool 10 is attached to a holder (not shown) and pressed against a rotationally symmetrical surface 52 of workpiece 50. Cutting tool 10 moves on rotationally symmetrical surface 52 along a path 21. Accordingly, cutting edge 3 machines rotationally symmetrical surface 52.

Figure 6:
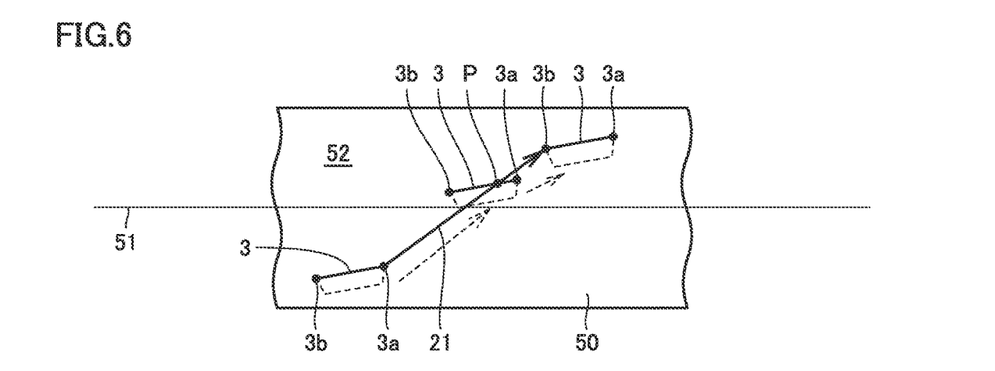
FIG. 6 is a schematic diagram schematically showing the cutting shown in FIG. 5.

FIG. 6 is schematic diagram schematically showing the cutting shown in FIG. 5. Referring to FIGS. 5 and 6, at the start of cutting, the position of one end 3a of cutting edge 3 is in contact with rotationally symmetrical surface 52. As cutting tool 10 is fed, the position (point P) of cutting edge 3 that is in contact with rotationally symmetrical surface 52 shifts from end 3a along cutting edge 3. At the end of the cutting, point P of cutting edge 3 is located at the other end 3b of cutting edge 3.

Regions of cutting edge 3 from end 3a to end 3b are successively brought into contact with the surface to be machined (rotationally symmetrical surface 52). This manner of machining enables the surface of workpiece 50 to be machined into a smooth surface of workpiece 50, and also enables high-productivity machining. Further, the whole of the cutting edge is used for cutting, and therefore the amount of wear of the flank face can be reduced. Accordingly, the life of the cutting tool can be extended.

Regarding the manner of cutting as described above, the contact resistance of cutting edge 3 and the surface roughness of machined workpiece 50 are related to each other. The closer the shape of cutting edge 3 to a linear shape, the smaller the surface roughness of machined workpiece 50. Meanwhile, the cutting resistance of cutting edge 3 against contact with workpiece 50 is larger. In an embodiment of the present invention, cutting edge 3 has a radius of curvature falling within a range of not less than 100 mm and not more than 500 mm. Accordingly, the surface of workpiece 50 can be machined into a smooth surface while the contact resistance of cutting edge 3 is prevented from increasing.

Regarding the manner of cutting as described above, the whole of cutting edge 3 is used to cut the surface of workpiece 50. If cutting edge 3 is short, substantially the same region of cutting edge 3 is used to cut the surface of workpiece 50. In this case, there is a possibility that the surface roughness is larger. In an example, a threaded groove is formed in rotationally symmetrical surface 52. Further, the amount of wear of the flank face is likely to increase. In contrast, if cutting edge 3 is too long, some regions of cutting edge 3 may not be involved in cutting, depending on the size of workpiece 50. In this case, effective use of the whole cutting edge 3 cannot be accomplished.

In an embodiment of the present invention, cutting edge 3 has a length of not less than 12 mm and not more than 50 mm. Accordingly, cutting with effective use of the whole of cutting edge 3 can be achieved.

Figure 7:
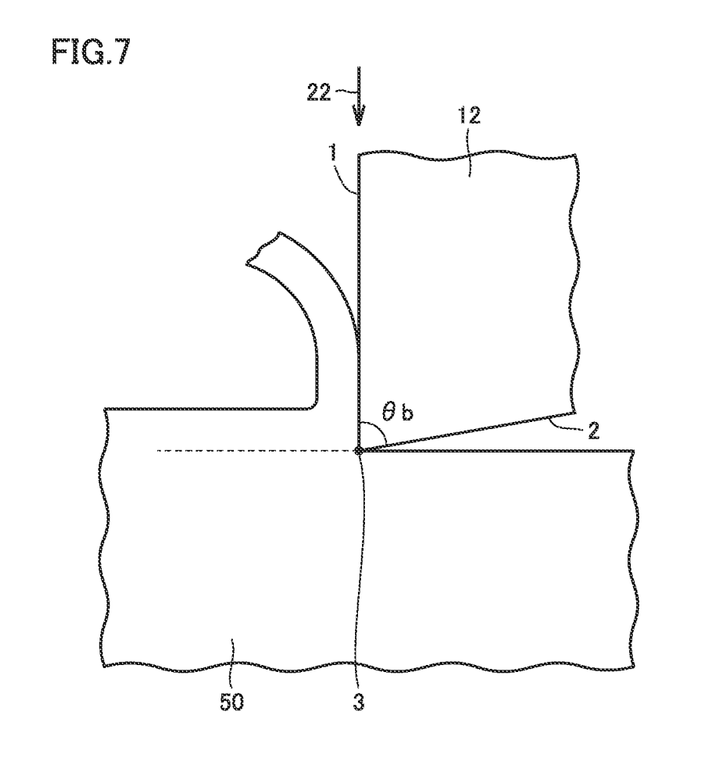
FIG. 7 is a partially enlarged view of a cutting edge during cutting of a workpiece.

FIG. 7 is a partially enlarged view of a cutting edge during cutting of a workpiece. Referring to FIG. 7, a wedge angle $\theta b$ is an angle formed by rake face 1 and flank face 2. The smaller the wedge angle $\theta b$, the smaller the cutting edge resistance.

If workpiece 50 is made of a high-hardness material such as hardened steel, for example, cutting tool 10 is required to be pressed strongly in a direction 22, in order for cutting edge 3 to bite into workpiece 50. If wedge angle $\theta b$ is small, fracture of the cutting edge is likely to occur. In an embodiment of the present invention, wedge angle $\theta b$ falls in a range of not less than 65° and not more than 90°. Accordingly, the possibility that fracture of the cutting edge occurs can be lowered while the cutting resistance is reduced.

Figure 8:
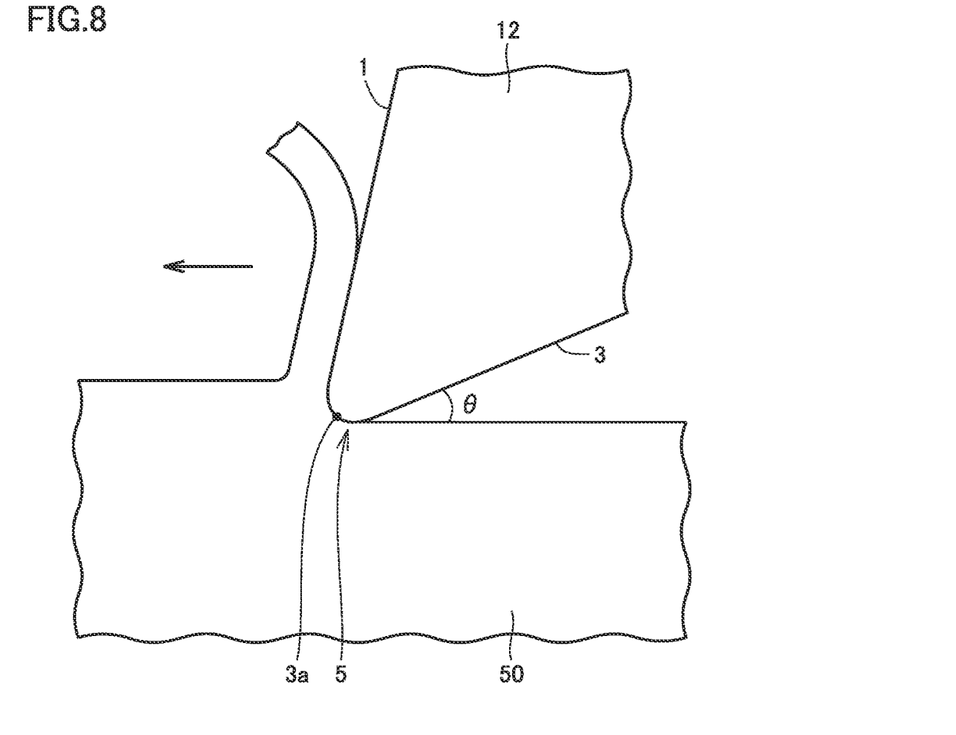
FIG. 8 is a schematic diagram for illustrating effects produced by a lateral flank angle of the cutting edge.

FIG. 8 is a schematic diagram for illustrating effects produced by lateral flank angle(s) $\theta a$ of cutting edge 3. As shown in FIG. 8, at the start of cutting, end 3a (corner 5) of cutting edge 3 is in contact with the surface of workpiece 50. Flank angle $\theta a$ of cutting edge 3 enables end 3a of cutting edge 3 to machine the workpiece. Likewise, immediately before the end of cutting, end 3b of cutting edge 3 is used to cut the surface of workpiece 50. Flank angle $\theta a$ enables cutting by means of the whole of cutting edge 3.

Further, cutting edge 3 has corners 5. Each corner 5 has a radius of curvature smaller than the radius of curvature of cutting edge 3 (see FIG. 2). Accordingly, fracture of cutting edge 3 can be suppressed, or the roughness of the surface of machined workpiece 50 can be reduced.

The shape of cutting edge 3 is not limited to the sharp edge shape. Specifically, cutting edge 3 may be chamfered. The following are examples of machining of cutting edge 3.

Figure 9:
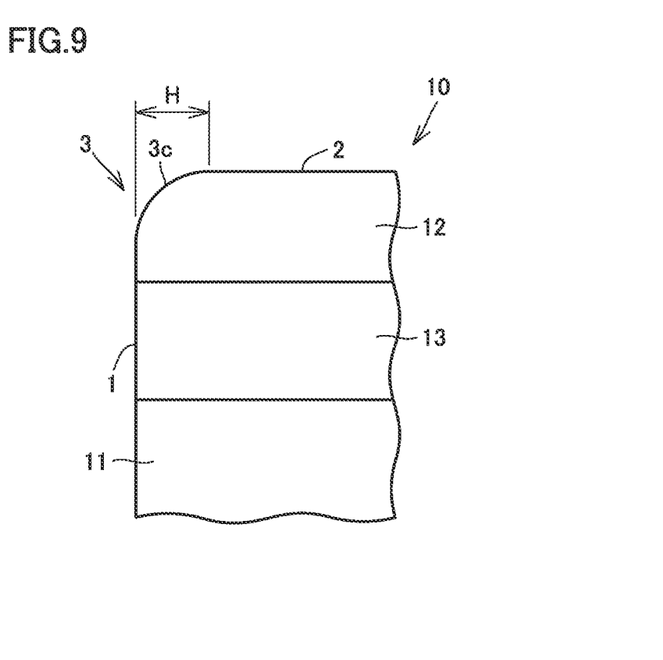
FIG. 9 is a schematic diagram showing a first example of machining of the cutting edge.

FIG. 9 is a schematic diagram showing a first example of machining of cutting edge 3. As shown in FIG. 9, cutting edge 3 may be honed. Specifically, cutting edge 3 has a rounded portion (honed portion 3c). H represents a honing amount of honed portion 3c with respect to rake face 1. In the present embodiment, honing amount H is not less than 0.001 mm and not more than 0.030 mm.

Figure 10:
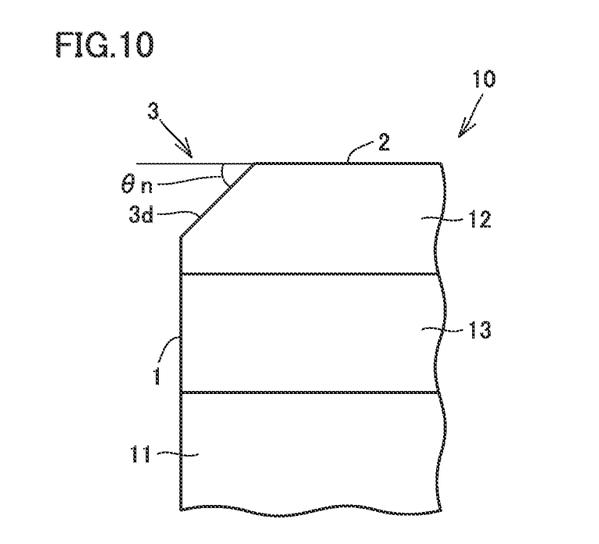
FIG. 10 is a schematic diagram showing a second example of machining of the cutting edge.

FIG. 10 is a schematic diagram showing a second example of machining of cutting edge 3. As shown in FIG. 10, cutting edge 3 may be machined to have a negative land. Specifically, cutting edge 3 has a negative land portion 3d. A negative land angle $\theta n$ is an angle formed by negative land portion 3d with respect to flank face 2. In the present embodiment, negative land angle $\theta n$ is not less than 0° and not more than 35°.

Figure 11:
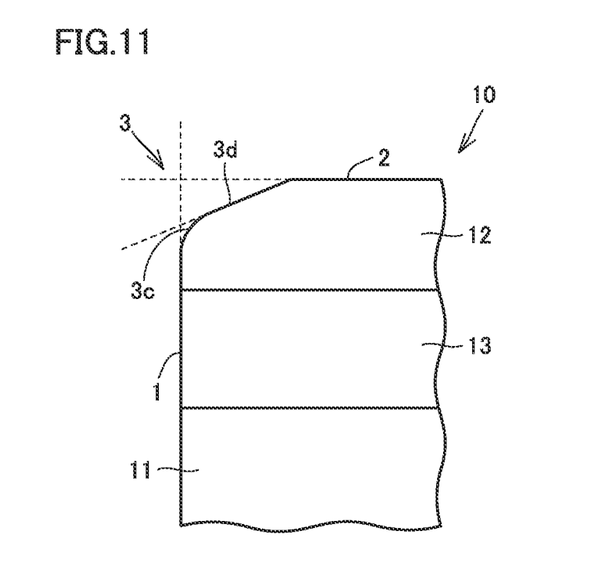
FIG. 11 is a schematic diagram showing a third example of machining of the cutting edge.

FIG. 11 is a schematic diagram showing a third example of machining of cutting edge 3. As shown in FIG. 11, cutting edge 3 may be honed and additionally machined to have a negative land. In other words, cutting edge 3 may have both honed portion 3c and negative land portion 3d.

[Cutting Test 1]

Influences of the radius of curvature of the cutting edge on the cutting performance were examined. With cutting tools of Examples and Comparative Example shown in Table 1 below, cutting was performed under the following cutting conditions, and the finished surface roughness, the cutting resistance, and the tool wear were evaluated. The results of the evaluation are shown in Table 1. The evaluation was made based on the criterion that a cutting tool exhibiting a finished surface roughness Rz (ten-point mean roughness) of 3.0 μm or less, a cutting resistance of 250 N or less, and a wear amount of the flank face that did not lead to fracture was identified as acceptable.

Cutting Conditions workpiece: rotationally symmetrical surface having an inclination angle of 11°, hardened steel (SCM415H), HRC60 cutting method: cutting of rotationally symmetrical inclined surface type of cutting: dry cutting cutting speed: 300 m/min depth of cut of tool: 0.1 mm feed rate of tool: 0.3 mm/rev Tool Shape material for tool: polycrystalline hard sintered material containing 70 vol % of cBN particles having an average particle size of about 4 μm shape of cutting edge: see Table 1 cutting edge profile: R honing (honing amount: 0.010 mm)

length of cutting edge: 15.875 mm tool flank angle: 0° flank angle when attached to holder: 15°

TABLE 1

| | sample No. | cutting edge shape | cutting edge radius (mm) | finished surface roughness Rz (μm) | cutting resistance (N) | flank face wear (μm) |
|---|---|---|---|---|---|---|
| Example | 1A | curved | 90 | 3.05 μm | 218.9 | 17 |
| | 1B | curved | 120 | 2.57 μm | 220.7 | 19 |
| | 1C | curved | 150 | 2.26 μm | 225.4 | 18 |
| | 1D | curved | 300 | 2.19 μm | 235.8 | 20 |
| | 1E | curved | 500 | 2.15 μm | 247.2 | 20 |
| | 1F | curved | 1000 | 2.08 μm | 307.3 | 45 |
| Comparative Example | 1G | linear | — | 2.07 μm | 321.0 | fracture |

As to the cutting tool of Sample No. 1A, while the cutting resistance was low, finished surface roughness Rz was more than 3 μm. As to the cutting tools of Sample Nos. 1F and 1G, while finished surface roughness Rz was 3 μm or less, the cutting resistance was 300 N or more. As to the cutting tool of Sample No. 1G, cutting edge fracture occurred.

As to the cutting tools of Sample Nos. 1B to 1E, both the finished surface roughness and the cutting resistance were acceptable. Further, no cutting edge fracture occurred.

It is seen from the above-described results that the arc shape of the cutting edge can reduce the cutting resistance. When radius of curvature R of the cutting edge is excessively small, the finished surface roughness is large. As shown in Table 1, it was confirmed the radius of curvature of the cutting edge is preferably not less than 100 μm and not more than 500 mm.

[Cutting Test 2]

Influences of the length of the cutting edge on the cutting resistance and the tool wear during cutting were examined. With cutting tools of Examples and Comparative Examples shown in Table 2 below, cutting was performed under the following cutting conditions, and the cutting resistance was evaluated. The results of the evaluation are shown in Table 2. The evaluation was made based on the criterion that a cutting tool exhibiting a cutting resistance of 300 N or less and a wear amount of the flank face of 30 μm or less was identified as acceptable.

Cutting Conditions workpiece: rotationally symmetrical surface having an inclination angle of 11°, hardened steel (S052), HRC60 cutting method: cutting of rotationally symmetrical inclined surface type of cutting: wet cutting cutting speed: 400 m/min depth of cut of tool: 0.05 mm feed rate of tool: 0.4 mm/rev Tool Shape material for tool: polycrystalline hard sintered material containing 50 vol % of cBN particles having an average particle size of about 2 μm shape of cutting edge: arc shape (cutting edge radius: 150 mm)

cutting edge profile: R honing (honing amount: 0.010 mm)

length of cutting edge: see Table 2 tool flank angle: 0° flank angle when attached to holder: 15°

TABLE 2

| | sample No. | cutting edge length (mm) | cutting resistance (N) | flank face wear (μm) |
|---|---|---|---|---|
| Comparative Example | 2A | 3 | 130.7 | 51 |
| Example | 2B | 5 | 189.7 | 33 |
| Example | 2C | 10 | 208.5 | 24 |
| | 2D | 15.875 | 222.9 | 18 |
| | 2E | 20 | 230.8 | 18 |
| | 2F | 30 | 237.8 | 15 |
| | 2G | 50 | 265.2 | 14 |
| Comparative Example | 2H | 55 | 303.3 | 13 |

The cutting tool of each of Sample Nos. 2A and 2B had a low cutting resistance. The cutting tool of Sample No. 2A had a flank face wear amount of 50 μm or more. The cutting tool of Sample No. 2B had a flank face wear amount of 30 μm or more.

The cutting tool of Sample No. 2H had a smaller flank face wear amount as compared with the cutting tools of Sample Nos. 2A and 2B. The cutting tool of Sample No. 2H had a cutting resistance of more than 300 N. As to the cutting tools of Sample Nos. 2C to 2G, both the cutting resistance and the flank face wear amount were acceptable.

It is seen from the above-described results that the cutting tools having a cutting edge length of 50 mm or less exhibit a low cutting resistance. It is further seen from the above-described results that the cutting tools having a cutting edge length of 10 mm or more exhibit a smaller flank face wear amount as compared with the cutting tool having a cutting edge length of 3 mm or 5 mm.

It is seen that the smaller the flank face wear amount, the longer the life of the cutting tool. As shown in Table 2, it has been confirmed that the length of the cutting edge is preferably not less than 10 mm and not more than 50 mm.

[Cutting Test 3]

Influences of the wedge angle on the cutting performance were examined. With cutting tools of Examples and Comparative Example shown in Table 3 below, cutting was performed under the following cutting conditions, and evaluation was made for the cutting resistance and whether or not fracture occurred. The evaluation was made based on the criterion that a cutting tool having a cutting resistance of 300 N or less and experiencing no fracture was identified as acceptable.

Cutting Conditions workpiece: cylindrical hardened steel (SCV420H), HRC60 cutting method: cutting of rotationally symmetrical surface type of cutting: wet cutting cutting speed: 220 m/min
depth of cut of tool: 0.15 mm
feed rate of tool: 0.2 mm/rev
Tool Shape
    material for tool: polycrystalline hard sintered material containing 65 vol % of cBN particles having an average particle size of about 3 μm
    shape of cutting edge: arc shape (cutting edge radius: 150 mm)
    cutting edge profile: see Table 5
    length of cutting edge: 15.875 mm
    tool wedge angle: see Table 3
    flank angle when attached to holder: 15°

TABLE 3

|  | sample No. | wedge angle (deg) | cutting resistance (N) | fracture |
|---|---|---|---|---|
| Example | 3A | 90 | 247.8 | no fracture |
|  | 3B | 85 | 240.1 | no fracture |
|  | 3C | 79 | 215.2 | no fracture |
|  | 3D | 75 | 190.7 | no fracture |
|  | 3E | 70 | 175.7 | no fracture |
|  | 3F | 65 | 163.5 | no fracture |
| Comparative Example | 3G | 60 | 158.2 | fracture |

As to the cutting tool of Sample No. 3G, while it had the lowest cutting resistance, fracture occurred. As to the cutting tools of Sample Nos. 3A to 3F, the cutting resistance was 300 N or less, and occurrence of fracture was suppressed.

It is seen from the above-described results that a wedge angle of the cutting tool falling in a range of not less than 65° and not more than 90° is preferred for achieving acceptable cutting performance.

[Cutting Test 4]

Influences of the honing amount of the cutting tool on the cutting resistance during cutting were examined. With the cutting tools of Examples and Comparative Examples shown in Table 4 below, cutting was performed under the following cutting conditions, and the cutting resistance and the fracture resistance were evaluated. The evaluation was made based on the criterion that a cutting tool having a cutting resistance of 250 N or less and experiencing no fracture was acceptable.

Cutting Conditions
    workpiece: rotationally symmetrical surface having an inclination angle of 9°, hardened steel (SCM415H), HRC60
    cutting method: cutting of rotationally symmetrical inclined surface
    type of cutting: dry cutting
    cutting speed: 300 m/min
    depth of cut of tool: 0.1 mm
    feed rate of tool: 0.3 mm/rev
Tool Shape
    material for tool: polycrystalline hard sintered material containing 70 vol % of cBN particles having an average particle size of about 4 μm
    shape of cutting edge: arc shape (cutting edge radius: 150 mm)
    cutting edge profile: see Table 4
    length of cutting edge: 15.875 mm
    tool flank angle: 0°
    flank angle when attached to holder: 15°

TABLE 4

|  | sample No. | honing amount (mm) | cutting resistance (N) | fracture |
|---|---|---|---|---|
| Comparative Example | 4A | 0 (sharp edge) | 170.9 | fracture |
| Example | 4B | 0.001 | 185.7 | no fracture |
|  | 4C | 0.005 | 209.2 | no fracture |
|  | 4D | 0.010 | 225.4 | no fracture |
|  | 4E | 0.020 | 238.1 | no fracture |
|  | 4F | 0.030 | 247.9 | no fracture |
| Comparative Example | 4G | 0.040 | 258.8 | no fracture |

The cutting tool of Sample No. 4A was a cutting tool having a non-honed cutting edge profile, namely a cutting tool having a sharp edge. As to the cutting tool of Sample No. 4A, while the cutting resistance was lower as compared with the cutting tools of other sample numbers, fracture occurred. As to the cutting tool of Sample No. 4G, while no fracture occurred, the cutting resistance was 250 N or more. As to the cutting tools of Sample Nos. 4B to 4F, both the cutting resistance and the fracture resistance were acceptable.

It has been confirmed from the above-described results that the honing amount achieving both reduction of the cutting resistance and high fracture resistance falls within a range of not less than 0.001 mm and not more than 0.030 mm.

[Cutting Test 5]

Influences of the negative land angle of the cutting tool on the cutting resistance during cutting were examined. With the cutting tools of Examples and Comparative Example shown in Table 5 below, cutting was performed under the following cutting conditions, and the cutting resistance was evaluated. The evaluation was based on the criterion that a cutting tool having a cutting resistance of 350 N or less was acceptable.

Cutting Conditions
    workpiece: cylindrical hardened steel (SCM415H), HRC60
    cutting method: cutting of rotationally symmetrical surface
    type of cutting: dry cutting
    cutting speed: 220 m/min
    depth of cut of tool: 0.15 mm
    feed rate of tool: 0.2 mm/rev
Tool Shape
    material for tool: polycrystalline hard sintered material containing 70 vol % of cBN particles having an average particle size of about 4 μm
    shape of cutting edge: arc shape (cutting edge radius: 200 mm)
    cutting edge profile: see Table 5
    length of cutting edge: 15.875 mm
    tool flank angle: 0°
    flank angle when attached to holder: 15°

TABLE 5

|  | sample No. | negative land angle (deg) | cutting resistance (N) |
|---|---|---|---|
| Example | 5A | 0 (no NL) | 246.3 |
|  | 5B | 15 | 297.2 |
|  | 5C | 25 | 314.6 |
|  | 5D | 35 | 345.5 |

TABLE 5-continued

| sample No. | negative land angle (deg) | cutting resistance (N) |
|---|---|---|
| Comparative Example 5E | 40 | 377.9 |

The cutting tool of Sample No. 5E had a cutting resistance of more than 370 N. As to the cutting tools of Sample Nos. 5A to 5E, the negative land angle was 35° or less. As to the cutting tools of Sample Nos. 5A to 5E, the larger the negative land angle, the higher the cutting resistance. As to the cutting tool of any of Sample Nos. 5A to 5E, the cutting resistance was less than 350 N.

It has been confirmed from the above-described results that a negative land angle of not less than 0° and not more than 35° is preferable for reducing the cutting resistance.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 rake face; 2 flank face; 3 cutting edge; 3a, 3b end (cutting edge); 3c honed portion; 3d negative land portion; 4 back surface; 5 corner; 10 cutting tool; 11 base material; 12 hard sintered material; 13 joint member; 21 path; 22 direction; 50 workpiece; 51 rotational axis; 52 rotationally symmetrical surface; H honing amount; L length; P point; R, Rc radius of curvature

The invention claimed is:

1. A cutting tool for cutting a rotationally symmetrical surface of a rotating workpiece, the cutting tool comprising:
   a rake face;
   a flank face; and
   a cutting edge connecting the rake face and the flank face,
   the cutting edge as seen from above the flank face having a shape including at least one arc,
   the arc having a radius of curvature of not less than 100 mm and not more than 500 mm,
   the cutting edge as seen from above the flank face further including:
      a first end having a convex shape; and
      a second end opposite the first end and having a convex shape, and
   the first end and the second end each having a radius of curvature smaller than the radius of curvature of the arc, and
   the flank face having a shape tapering from the first and second ends toward a back surface opposite to the rake face.

2. The cutting tool according to claim 1, wherein the cutting edge has a length of not less than 12 mm and not more than 50 mm.

3. The cutting tool according to claim 1, wherein the rake face and the flank face form a wedge angle of the cutting tool of not less than 65° and not more than 90°.

4. The cutting tool according to claim 1, wherein the cutting edge is a part of a sintered material containing cubic boron nitride.

5. The cutting tool according to claim 1, wherein the cutting edge has a rounded honed portion, and a honing amount of the honed portion with respect to the rake face is not less than 0.001 mm and not more than 0.030 mm.

6. The cutting tool according to claim 1, wherein the cutting edge has a negative land portion, and the negative land portion forms an angle of not less 0° and not more than 35° with the flank face.

* * * * *